US011619536B2

(12) United States Patent
Welle et al.

(10) Patent No.: US 11,619,536 B2
(45) Date of Patent: Apr. 4, 2023

(54) LEVEL RADAR DEVICE WITH ADAPTIVE TRANSMISSION POWER ADJUSTMENT

(71) Applicant: VEGA GRIESHABER KG, Wolfach (DE)

(72) Inventors: Roland Welle, Hausach (DE); Michael Fischer, Alpirsbach (DE); Uwe Wegemann, Moers (DE); Ralf Reimelt, Freiburg (DE)

(73) Assignee: VEGA GRIESHABER KG, Wolfach (DE)

( * ) Notice: Subject to any disclaimer, the term of this patent is extended or adjusted under 35 U.S.C. 154(b) by 153 days.

(21) Appl. No.: 16/870,629

(22) Filed: May 8, 2020

(65) Prior Publication Data

US 2020/0355535 A1 Nov. 12, 2020

(30) Foreign Application Priority Data

May 9, 2019 (EP) .................................... 19173513

(51) Int. Cl.

| | |
|---|---|
| ***G01F 23/284*** | (2006.01) |
| ***G01S 7/00*** | (2006.01) |
| ***G01S 7/03*** | (2006.01) |
| ***G01S 7/02*** | (2006.01) |

(52) U.S. Cl.

CPC ............ *G01F 23/284* (2013.01); *G01S 7/003* (2013.01); *G01S 7/023* (2013.01); *G01S 7/0236* (2021.05); *G01S 7/03* (2013.01)

(58) Field of Classification Search

CPC ........ G01F 23/284; G01S 7/003; G01S 7/023; G01S 7/0236; G01S 7/03; G01S 13/422; G01S 13/88

See application file for complete search history.

(56) References Cited

U.S. PATENT DOCUMENTS

| | | | | |
|---|---|---|---|---|
| 7,460,057 B2 | 12/2008 | Fehrenbach et al. | | |
| 9,684,061 B2 | 6/2017 | Bilgic et al. | | |
| 2008/0282793 A1* | 11/2008 | Jirskog | G01F 23/284 | 73/290 V |
| 2015/0253177 A1* | 9/2015 | Blodt | G01F 23/284 | 324/644 |
| 2016/0054167 A1* | 2/2016 | Welle | G01S 13/426 | 342/124 |
| 2018/0335332 A1 | 11/2018 | Welle | | |

(Continued)

FOREIGN PATENT DOCUMENTS

| | | |
|---|---|---|
| DE | 10 2005 057 094 A1 | 6/2007 |
| EP | 2 848 902 A1 | 3/2015 |

(Continued)

OTHER PUBLICATIONS

European Search Report dated Nov. 7, 2019 in Patent Application No. 19173513.3 (with English translation of categories of cited documents), 11 pages.

*Primary Examiner* — Erin F Heard

*Assistant Examiner* — Juliana Cross

(74) *Attorney, Agent, or Firm* — Oblon, McClelland, Maier & Neustadt, L.L.P.

(57) ABSTRACT

A level radar device with adaptive, angle-dependent transmission power adjustment, which calculates the maximum permissible transmission power of the transmitted signal on the basis of the radiation direction of the transmitted signal and the radiation characteristic of an antenna.

20 Claims, 4 Drawing Sheets

102
207
104
205
200
208
206
201
202

(56) References Cited

U.S. PATENT DOCUMENTS

| | | | |
|---|---|---|---|
| 2018/0372526 | A1 | 12/2018 | Welle et al. |
| 2018/0372527 | A1 | 12/2018 | Griessbaum et al. |
| 2018/0372528 | A1 | 12/2018 | Griessbaum et al. |
| 2018/0372529 | A1 | 12/2018 | Welle et al. |
| 2018/0372530 | A1 | 12/2018 | Welle et al. |

FOREIGN PATENT DOCUMENTS

| | | | | | |
|---|---|---|---|---|---|
| JP | 2010281643 | A | * | 12/2010 | |
| WO | WO 2007/062842 | A2 | | 6/2007 | |
| WO | WO-2017084701 | A | * | 5/2017 | ............. H01Q 1/225 |

* cited by examiner

LEVEL RADAR DEVICE WITH ADAPTIVE TRANSMISSION POWER ADJUSTMENT

CROSS-REFERENCE TO RELATED APPLICATIONS

This application claims the benefit of the filing date of European Patent Application No. 19 173 513.3 filed on 9 May 2019 the entire content of which is incorporated herein by reference.

FIELD

The disclosure relates to level radar systems. In particular, the disclosure relates to a level radar device for adaptive transmission power adjustment, a level radar antenna for such a level radar device, a method for adaptive transmission power adjustment of a level radar device, a program element and a computer-readable medium.

BACKGROUND

Level radar devices, for determining a level of a product or the height or volume of a bulk material, use high-frequency electromagnetic signals as emitted signals which are radiated in the direction of the product. These instruments are generally operated inside an industrial plant in vessels or outside closed vessels in installations in open field.

The operation of these devices is based on the transmission and reception of high-frequency electromagnetic radio signals, typically in the frequency bands regulated for this purpose in Europe and the USA around 6 GHz, 10 GHz, 24 GHz, or between 57 GHz and 64 GHz, or between 75 GHz and 85 GHz.

Various regulatory requirements exist to "protect" other spectrum users and ensure the coexistence of different radio services. In particular, primary radio services must be protected from interference radiation, especially those which enjoy a protective status compared to secondary radio services or radio applications with a short range (Short Range Devices, SRD). Level radars are assigned to short-range radio applications. Primary radio services are, for example, directional radio services for communication and data transmission, broadcasting services, aeronautical radio services or radio astronomy stations. For this reason, certain installation conditions must be met for radar level transmitters, for example, in the open air, and the directional characteristic of the antenna used must also meet certain criteria (see norm EN 302 279 V2.1.1, Chapter 4.6).

SUMMARY

It is an object of the present disclosure to provide a level radar device which avoids excessive radiation of interfering radiation.

This task is solved by the subject matter of the independent claims. Further developments of the disclosure are stated in the sub-claims and the following description of embodiments.

A first aspect of the disclosure relates to a level radar device up for adaptive transmission power adjustment. It comprises an antenna device (antenna) which is adapted to emit a transmission signal in the direction of the product or bulk material. A beam angle determining device (radiation angle circuitry) is provided which is arranged to determine the direction of the beam of the transmitted signal. In addition, the level radar device comprises a control device (control circuitry) which is arranged to set a maximum permissible transmission power of the transmission signal on the basis of the direction of radiation determined by the level radar device and a radiation characteristic of the antenna device.

The transmission power setting may be adaptive, as the maximum transmission power may be changed by the device if the device is pivoted or tilted or the direction of the transmission signal is changed.

In addition to the mechanical tilting of the device, the direction of radiation may also be changed in the manner of an electronic beam control according to an embodiment. In this case, an array antenna is provided whose individual transmitting elements are energized or controlled accordingly.

According to an embodiment, the level radar comprises a data memory on which the radiation pattern of the antenna device and/or a calculation rule for calculating the radiation pattern is stored.

This data storage may also be located outside the level radar, for example in a cloud or on a server with which the level radar device communicates. In particular, it may be provided that the necessary calculations of the maximum permissible transmission power of the transmitted signal are carried out outside the measuring device and that the measuring device is then only informed of the final result in order to adjust the transmission power in accordance with the rules.

According to a further embodiment, the level radar device has a communication interface, wherein the control device is arranged to request the radiation pattern from an external device via the communication interface.

According to a further embodiment, the level radar has a detection device which is arranged to identify the antenna device.

For example, the recognition device (recognition circuitry) has its own data memory, which is attached to the antenna device and stores identification data of the antenna device. The recognition device may be arranged to transmit the identification data for identifying the antenna device to the control device of the measuring instrument.

An RFID chip can be used for this purpose, for example.

According to a further embodiment, the radar level measurement device comprises position determining means (position determining circuitry) arranged to determine the position of the level radar, wherein the control device is arranged to adjust the transmission power of the transmission signal on the basis of the position of the level radar.

For example, the measuring instrument may determine in which country it is located and, based on this, which regulations regarding the emission of radar signals must currently be complied with.

According to a further embodiment, the control device is arranged to adjust the transmitting power of the transmitting signal on the basis of the angle of the direction of radiation of the transmitting signal towards the surface of the medium.

For example, it may be provided that if the main radiation direction of the antenna is perpendicular to the product surface, the transmitting power is set higher than if the main radiation direction of the transmitted signal is not set perpendicular to the product surface. In the latter case, a considerable part of the emitted signal will pass the antenna after reflection from the product surface.

According to another embodiment, the beam angle determination device has an inclination sensor so that the beam angle can be determined very efficiently and accurately.

Another aspect relates to a level radar antenna for a level radar device described above and below, which comprises a data memory attached to the level radar antenna and storing identification data of the level radar antenna. The data memory is adapted to transmit the identification data for identifying the level radar antenna to the control device of the level radar or an external body.

A further aspect relates to a method for adaptive transmission power adjustment of a level radar in which the direction of radiation of the transmission signal of an antenna device is determined by a radiation angle determining device. On the basis of the radiation direction determined in this way and a radiation characteristic of the antenna device used, a transmission power of the transmission signal is set by a control device which does not exceed the maximum permissible value under these conditions. This control device may be provided in the level radar or, at least partially, in an external device. The transmitted signal is then radiated by the antenna device in the direction of the product, with a transmission power corresponding to the maximum permissible transmission power determined or less.

Another aspect relates to a program element which, when executed on a control device of a level radar, instructs the level radar to perform the steps described above and below.

Another aspect relates to a computer-readable medium on which the program element described above is stored.

The computer program may, for example, be loaded and/or stored in a working memory of a data processing device, such as a data processor, whereby the data processing device may also be part of an embodiment of the present disclosure. This data processing device may be set up to perform process steps of the method described above. The data processing device may also be set up to automatically execute the computer program or the method and/or to execute user inputs. The computer program may also be made available via a data network, such as the Internet, and downloaded from such a data network into the working memory of the data processing equipment. The computer program may also include an update of an existing computer program, which may, for example, enable the existing computer program to carry out the procedure described above.

The computer-readable medium may in particular, but not necessarily, be a non-volatile medium particularly suitable for storing and/or distributing a computer program. The computer-readable storage medium may be a CD-ROM, a DVD-ROM, an optical storage medium, a solid-state medium or the like supplied with or as part of other hardware. In addition or as an alternative, the computer-readable storage medium may also be distributed or sold in other forms, such as over a data network, such as the Internet or other wired or wireless telecommunications systems. For this purpose, the computer-readable storage medium may be designed as one or more data packages, for example.

In the following, embodiments are described with reference to the figures. The representations are schematic and not to scale. If the same reference signs are used in the following figure description, they denote identical or similar elements.

SHORT DESCRIPTION OF THE FIGURES

DETAILED DESCRIPTION OF EMBODIMENTS

Figure 1:
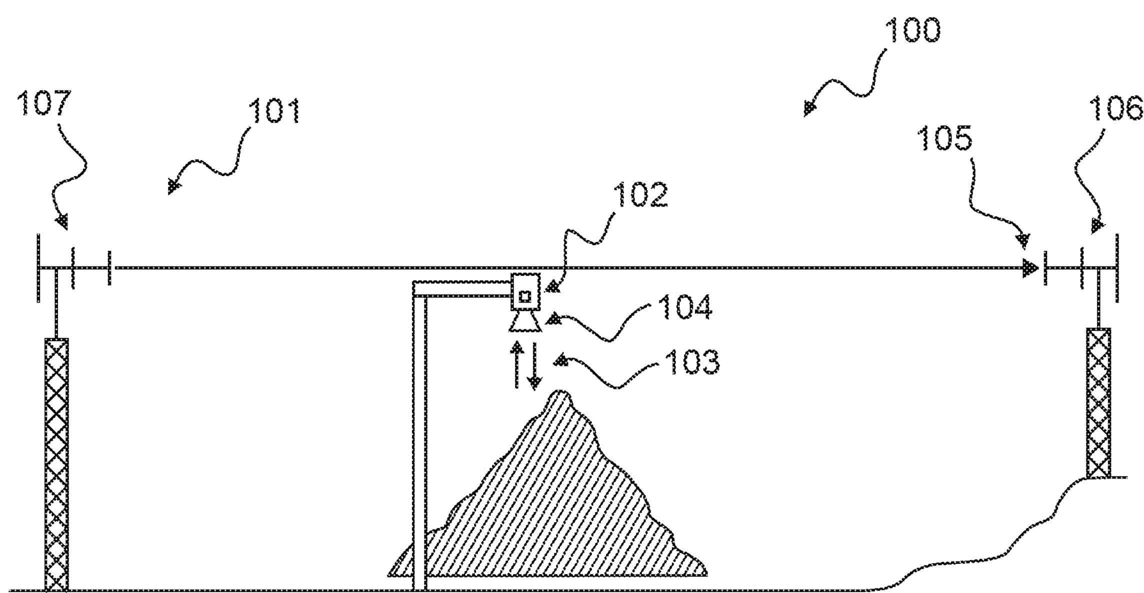
FIG. 1 shows a measuring set-up with a level radar unit.

FIG. 1 shows a measuring set-up with a level radar 102 for bulk material measurement. Many radio receivers receive signals from directions with low elevation angles of the receiving antenna. This can be observed particularly in the case of ground-based radio relay services 101 with almost horizontal transmission and reception direction or in the case of mobile radio services.

Radar level transmitters 102 are generally operated in the open field with the antenna pointing vertically downwards (perpendicular direction). With this alignment, the main beam direction 103 of the combined emitting and receiving antenna 104 of the level gauge 102 and the main receiving direction 105 of the receiving antenna 106 of the radio link 101 are perpendicular to each other.

In this case, it may be assumed that the signal decoupling of both radio services is maximum and thus the influence of the level sensor 102 on the directional radio receiver 106 or the directional radio transmitter 107 is minimal. In this case, the interference, for example, of the radio relay receiver 106 by the level sensor 102 may only occur via multipath propagation by reflection, diffraction, scattering, which however may cause additional signal attenuation, or directly via the side lobes of the level radar antenna. The directional factors of the side lobes of the antenna diagram in the angular range around 90° to the main beam direction are very small, especially with the highly directional level radar antennas 104, compared to the directional factor in main beam direction 103. In both cases, the interference potential at the location of the receiver 106 is thus considerably reduced. Suitable antenna versions for level radars with high directivity are for example horn and waveguide radiators, antennas with dielectric lenses, parabolic antennas, planar antennas and antenna arrays.

Figure 2A:
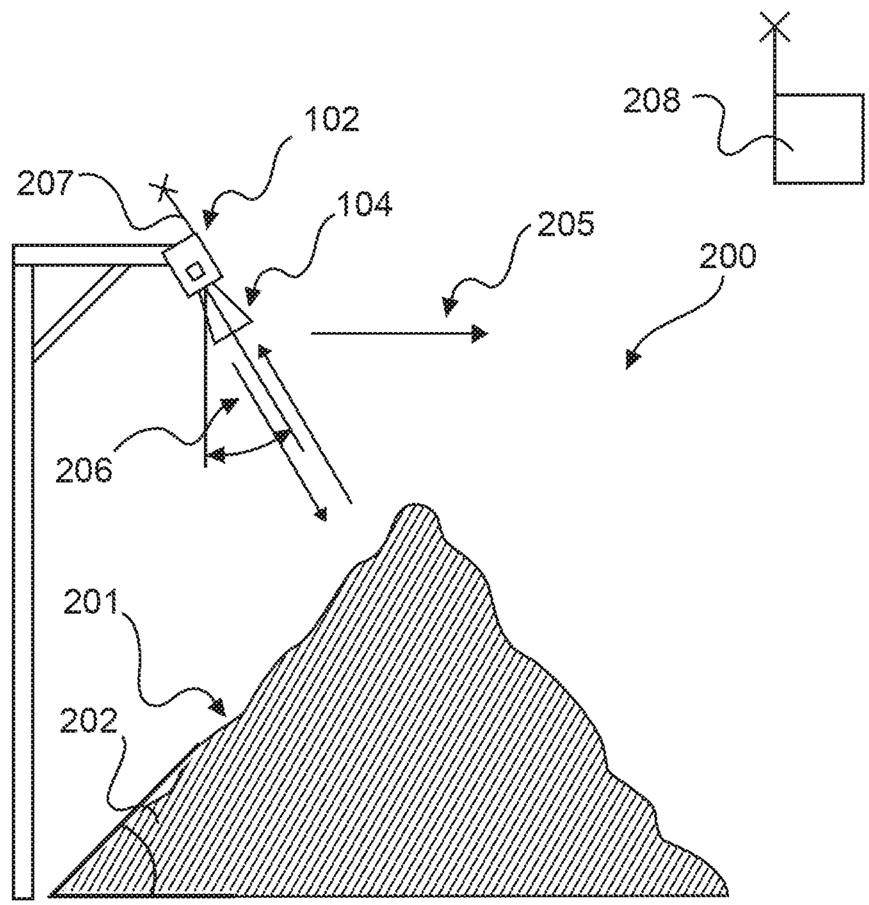
FIG. 2A shows another measurement setup with a tilted level radar.

However, in certain cases it may be necessary to tilt the complete radar level sensor with attached antenna or only the antenna or only the main beam direction of the antenna by a certain angle 206 to the perpendicular direction, so that an echo signal is reflected back from the product surface at all. This is shown in FIG. 2A. Swiveling only the main beam direction can be achieved, for example, with a phased array antenna. By appropriate adjustment e.g. of the integrated phase shifters, an electronic beam swiveling is possible without changing the mechanical installation angle of the antenna to the perpendicular direction.

Tilting the whole antenna or at least the main lobe of the antenna may be particularly advantageous when measuring on non-flat product surfaces 201 with certain repose angles 202. The level sensor 102 is aligned such that the main beam direction of the combined emitting and receiving antenna 102 points in the direction of the tip of the material cone and is preferably perpendicular to the surface to be measured. If the level sensor were mounted with the main beam direction vertically downward, a large part of the signal power would be reflected away from the inclined bulk solid surface 201 and would not return to the level sensor 102. In this case, a level measurement would either not be possible at all or only with a considerably reduced signal-to-noise ratio and thus also with reduced measurement reliability.

However, if the level radar antenna and/or the electronically tilted main lobe of the antenna is tilted away from the direction of the vertical line, the potential for interference with other spectrum users and radio services may increase. This may be the case because the radiation of the level radar in the horizontal direction 205 now takes place via side lobes with higher directivity factors, i.e. the interference level at the location of the foreign receiver is higher compared with the situation with a level radar antenna directed vertically downwards. In this connection it should be noted that with directional antennas, as generally used in level radar equipment, directional factors of side lobes decrease considerably with increasing angles of deviation to the main beam direction.

By tilting the level radar antenna and/or electronically swiveling the main lobe of a phased array antenna, optimum reflection conditions on the product surface may be created and thus ensure optimum measurement reliability. In order not to increase the interference potential compared to other radio services, an adaptive emitting power adjustment may be provided. Measuring instrument 102 can have a communication interface 207 via which it exchanges data with an external instrument 208, for example a server or a cloud.

On the one hand, the possibility of inclining the main beam direction of the antenna relative to the perpendicular direction ensures that the reflection conditions, e.g. when measuring against bulk solid surfaces under certain repose angles 202, become optimal, i.e. the largest possible part of the emitted signal is reflected back in the direction of the antenna of the level measuring instrument. In order not to increase the interference potential compared to other spectrum users, the emitted power of the level sensor is reduced depending on the angle of inclination of the main beam direction to the perpendicular direction and the radiation characteristics of the antenna used. A reliable measurement with sufficient reliability may thus be ensured under optimum reflection conditions on the product surface, often even with reduced emitted power. The reduction of the emitting power of the level meter with increasing inclination angle of the antenna main beam direction relative to the perpendicular direction can be realized, for example, in several steps as shown in FIG. 2B.

Figure 2B:
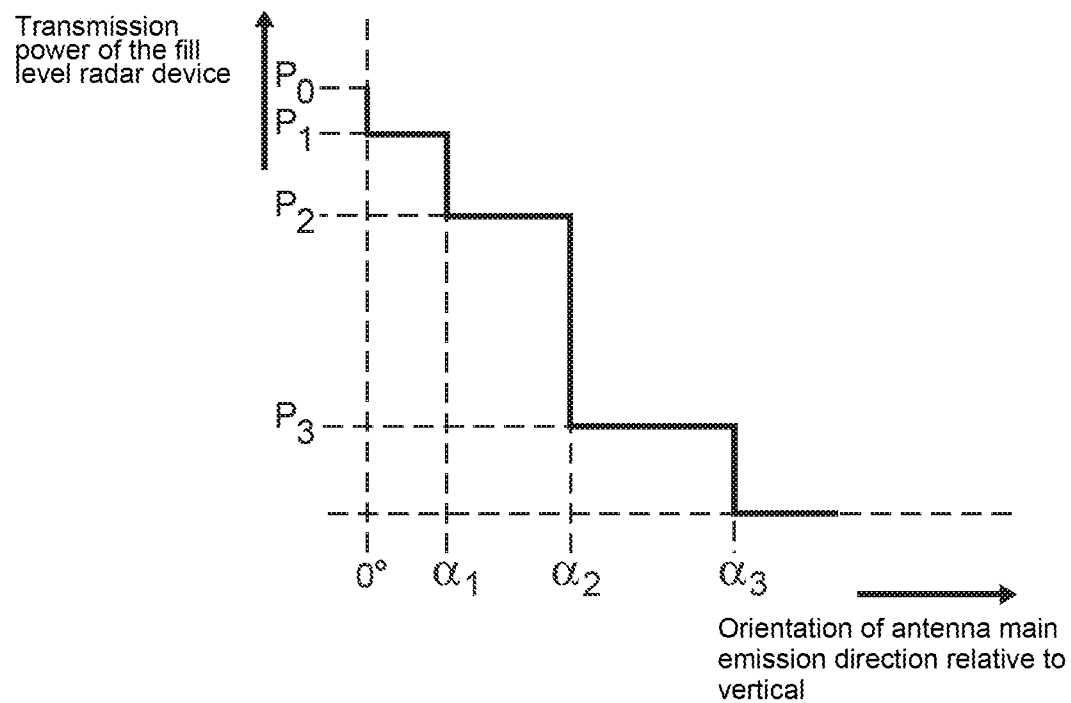
FIG. 2B shows a possible dependency of transmission power and tilt angle.

The curve in FIG. 2B results from the radiation characteristic of the antenna used and the maximum transmission power of the level sensor 102.

If the main beam direction of the antenna is vertically downwards (0°), the signal is transmitted with maximum power $P_0$. In the angular range greater than 0° up to the angle of inclination at the transmit power is reduced to a value $P_1$. In the angular range greater than $\alpha_1$ to $\alpha_2$ the transmission power reduced to a value $P_2$, etc.

Figure 3:
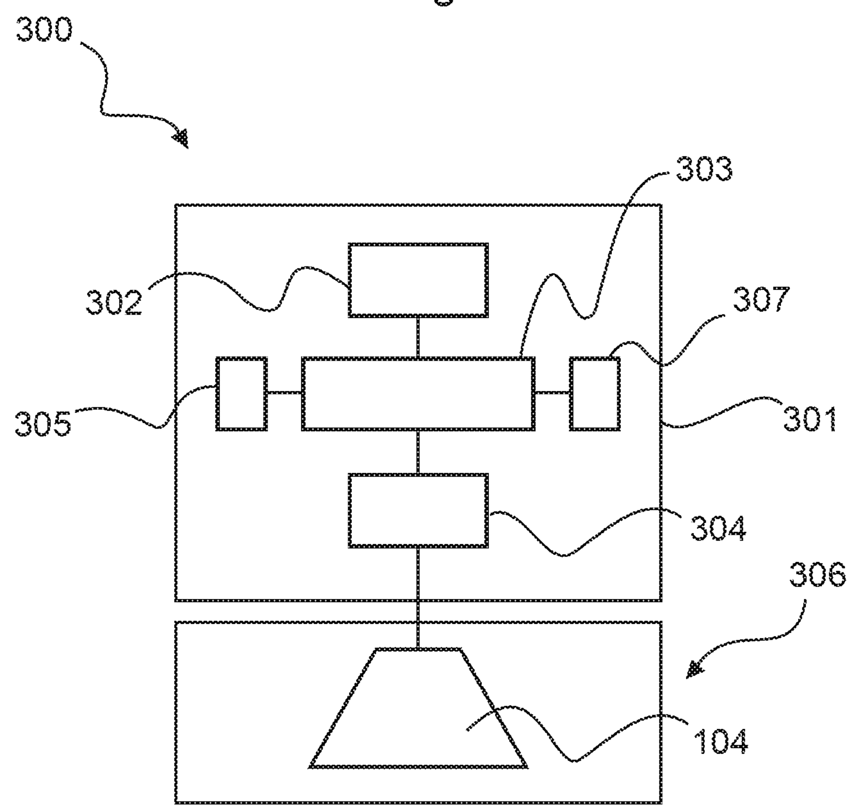
FIG. 3 shows a level radar unit according to an embodiment.

According to an embodiment shown in FIG. 3, the electronic or control device 301 of the level radar 300 has a power supply unit 302 which supplies all components of the electronic device 301 with electrical energy, a control and evaluation device 303, the high frequency device 304 and the angle determination device 305. The angle determination device can, for example, consist of a commercially available electronic inclination sensor which may be equipped with SMT and may be integrated into the electronic device 301 or directly on or in the antenna 306. Of course, mechanical or electromagnetic devices are also possible, which detect the position of the antenna 306 in relation to the perpendicular direction electronically, inductively, capacitively or optically.

In case of a phased array antenna the direction of the main lobe is determined by the set-up of the integrated phase shifters and additionally by the mechanical installation angle of the antenna plane to the perpendicular direction. In this case, the angle determination device preferably comprises a tilt sensor and a calculation specification on how to determine the main beam direction in relation to the antenna plane from the individual settings of the phase shifters.

The combined transmitting and receiving antenna 306 is connected to the electronic unit 301. The use of separate emitting and receiving antennas is also possible. The radar sensor 300 is generally installed by specialist personnel and optimally aligned to the measured product surface 201. It may happen that the antenna 306 must be mechanically and/or the skin lobe of the antenna must be electronically inclined to create optimum reflection conditions on the product surface. The beam angle determining device 305 detects the angle of inclination of the antenna main beam direction to the perpendicular direction and transmits the value to the control and processing system 303. Together with the radiation characteristic of the antenna used, which are available for example as calculation formula or as table values in a memory area 307 of the control and processing device 303 and were stored in the factory during production of the sensor, the control and processing device 303 determines the maximum possible emitted power for this situation so that no interferences are caused in components of other radio services 106, 107 which are possibly in the immediate vicinity and thus particularly endangered by unintentional radiation from the radar level sensor.

The maximum possible transmission power or any lower transmission power is transmitted by the control and evaluation unit 303 to the radio frequency section 304. There, for example, the desired transmission power is set by the appropriate setting of a variable attenuator or an amplifier with variable gain.

During the life cycle of the measuring device, i.e., the radar level sensor 102, requirements may change that make a reconfiguration of the level sensor necessary. To facilitate this, it is often possible to exchange the electronics 301 and/or the antenna 306 of level sensors and adapt them optimally to the new measuring situation. If now the antenna 306 and/or the electronics 301 are exchanged, the correct antenna data must be stored again in memory 307. Ideally, the suitable antenna data are already available in memory 307 and must only be selected and activated. This procedure may be carried out by the operating personnel when reconfiguring the sensor and exchanging the antenna and/or electronics system, but at the same time there is a risk of incorrect settings due to manual intervention, as many antenna versions have the same appearance but considerably different directional characteristics. In the worst case, such incorrect operation leads to increased radiation of electromagnetic energy of the radar level sensor, which in turn causes undesired interference in another radio service.

To avoid this, another embodiment of a radar level sensor 400 is proposed. The antenna device 402 is equipped with a detection device 403, which allows a clear identification of the antenna. The detection device 403, which is mounted on or in the antenna or in the coupling belonging to the antenna, has a data memory 405 and is read out by the read-out device 404, which is located in the electronic device 401, or transmits this identification data to the antenna device. Thus a clear identification of the antenna version used in the individual case and thus also its antenna characteristics is possible and the transmission level reduction can be carried out automatically depending on the angle of inclination of the main beam direction detected by the angle determination device 305. Communication between the detection device 403 and the read-out device 404 may be wireless using any radio technology for data transmission, for example RFID (Radio Frequency Identification) technology. Of course, other short-range radio technologies such as Bluetooth, ZigBee, WLAN, etc. may also be used. A wired readout of the recognition device 403 is also possible. However, this requires an additional plug connection between electronic device 401 and antenna 402.

Figure 5:
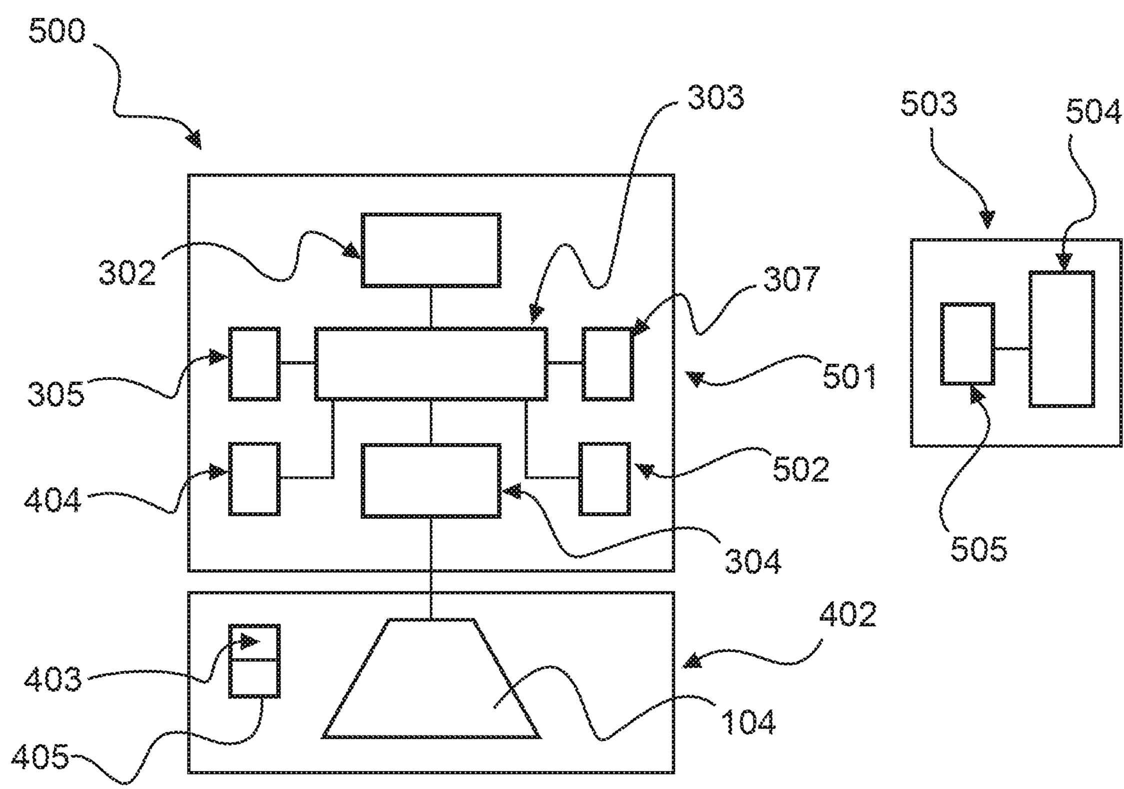
FIG. 5 shows a level radar unit according to another embodiment.
Figure 6:
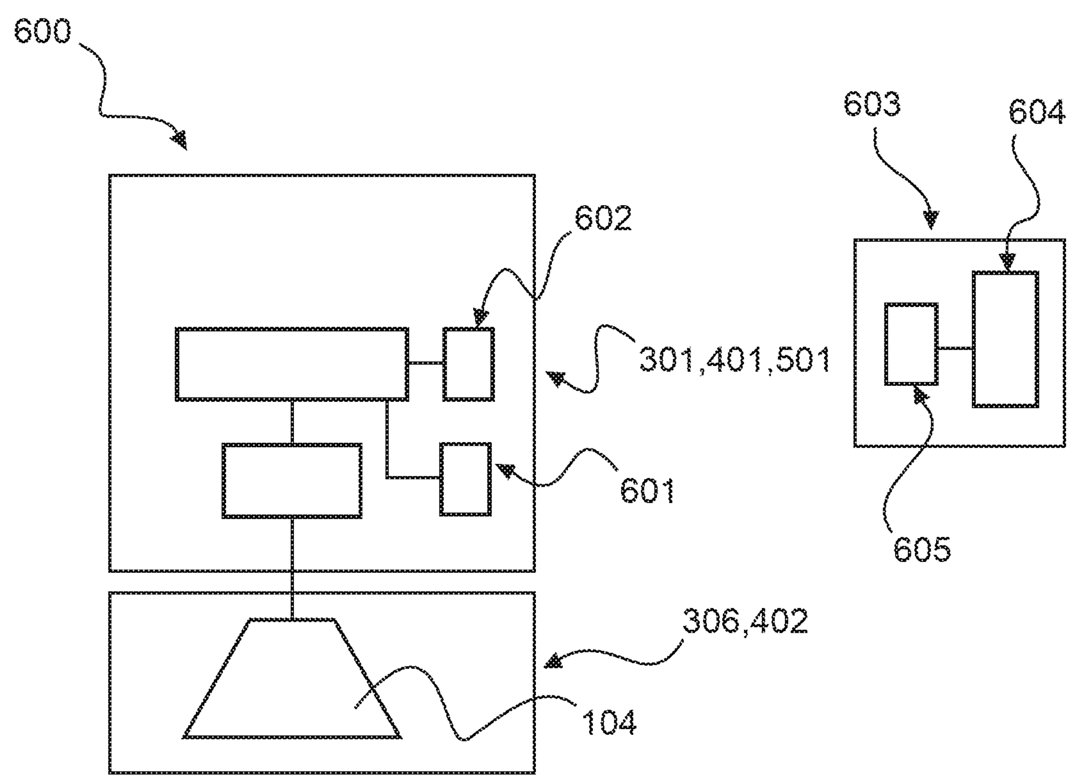
FIG. 6 shows a level radar unit according to another embodiment.

If new antenna designs are added in the course of the product life cycle of the radar level sensor or if antenna constructions are changed, which have an influence on the directional characteristic, the correct antenna data may not be available in memory 307 of the sensors 300 and 400 installed in a measuring point and would have to be stored in memory again later on when the antenna is changed at the measuring point. This may only be possible with external access, e.g. with the help of a wired or wireless communication connection, and requires a service call which, according to experience, is associated with a considerable effort. In order to remedy this situation, a further design example is suggested in FIG. 5.

Figure 4:
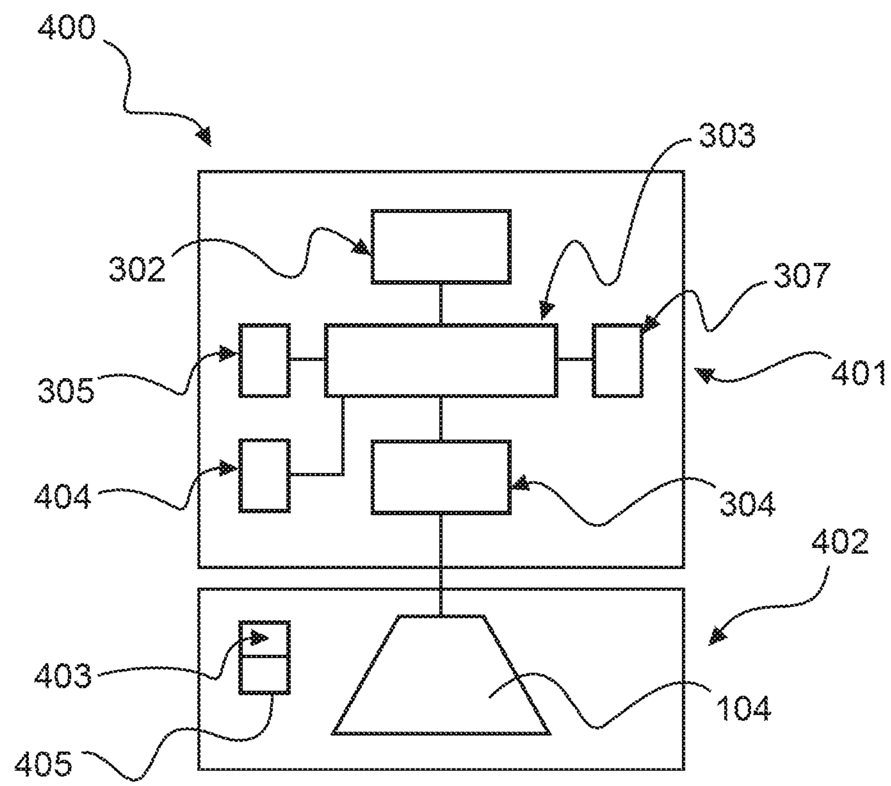
FIG. 4 shows a level radar unit according to another embodiment.

In this embodiment, the antenna data is stored in a database 503, which may be located anywhere. The data stored in memory 504 can be accessed and updated at any time without costly service calls. When changing the antenna 402 on the radar level sensor 500, the new antenna is first automatically identified as described in the design example in FIG. 4 above. Then the correct antenna data are transmitted, for example wirelessly from the database to the level sensor. With the antenna data and the angle of inclination of the antenna main lobe to the direction of the plumb line determined by the angle determination device 305, the control and evaluation device 303 determines the maximum possible transmission power for this situation and sets this or any lower transmission power in the high frequency part 304. The request for the current antenna data is made by the level sensor 500 preferably via a wireless communication connection with corresponding transmitting and receiving devices 502, 505 in the level sensor 500 and in the database 503. A mobile radio connection is suitable for this purpose, for example.

In order to improve coordination with other radio services, especially primary radio services, and thus to make optimum use of the limited radio spectrum available, another implementation example is proposed. It comprises a radar level sensor 600 according to one of the design examples in FIG. 3 to FIG. 5, which additionally contains a positioning device 601 (e.g. GPS, Glonass, Galileo, mobile radio) and a wireless radio interface 602. Via the position determination device 601 the level sensor itself determines its exact position on the earth's surface and passes this on to a central server 603 via the wireless communication interface 602, 605. The central server contains a database 604, which contains the location data of all radio services that are to be protected against harmful radiation from the level sensor. For example, these are the location data of transmitters 107 and receivers 106 of primary and/or secondary radio services. If the radar level sensor is located in the vicinity of such a radio service, the reduction of the transmission power is carried out depending on the angle of inclination and the antenna characteristics as described in one of the design examples in FIG. 3 to 5. If no transmitter or receiver of a radio service to be protected is within range of the level sensor, there is no reduction of the transmitting power during level measurement. This procedure is also particularly advantageous if spectrum allocations are made by regulatory authorities in the future and thus new types of radio services are added which are installed in the vicinity of radar level sensors. For this purpose, however, it may be necessary that the level sensor 600 regularly checks the database 604 with the location data of the radio services to be protected via the radio interface 602, 605.

It may be considered as a key aspect of the present disclosure to implement the an adaptive transmit power adjustment in a radar level sensor, which, depending on the antenna main beam direction in relation to the perpendicular, i.e. vertical direction and the radiation characteristics of the antenna used, determines the maximum compatible transmit power for this situation and adjusts the actually used transmit power to a value smaller or equal to the maximum compatible transmit power without increasing the interference level at locations of other spectrum users. For this purpose, an angle determination device is integrated into the level measuring instrument which detects the deviation of the main beam direction of the antenna to the perpendicular direction. Furthermore, access to the radiation characteristics of the antenna used may always be ensured.

Figure 7:
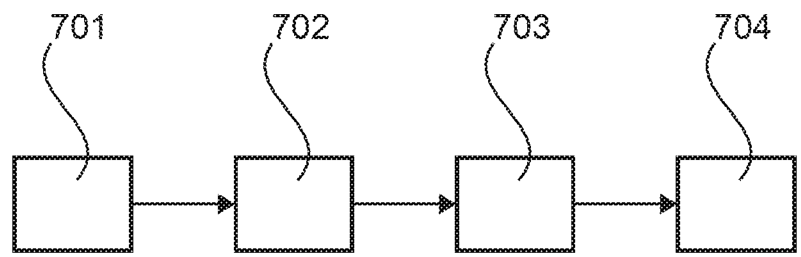
FIG. 7 shows a flowchart of a process according to an embodiment.

FIG. 7 shows a flowchart of a process according to an embodiment. In step 701, the direction of radiation of the transmitted signal of an antenna device is determined by using, for example, a radiation angle determination device integrated in the level measuring instrument. In step 702, the control device retrieves data from a memory describing the radiation pattern of the antenna equipment used. Alternatively or additionally, the radiation pattern of the antenna device is calculated by the control device using a calculation rule. In step 703, the maximum permissible transmission power for the transmitted signal is then calculated on the basis of the radiation direction and the radiation pattern, and the transmission power is set in step 704 so that it corresponds at most to the maximum permissible transmission power.

In addition, it should be noted that "comprising" and "having" does not exclude other elements or steps and the indefinite articles "a" or "an" do not exclude a plurality. It should also be noted that features or steps described with reference to one of the above embodiments may also be used in combination with other features or steps of other embodiments described above. Reference marks in the claims are not to be considered as restrictions.

The invention claimed is:

1. A level radar apparatus configured for adaptive transmission power adjustment, comprising:

an antenna configured to radiate a transmission signal in a direction of a medium;

radiation angle circuitry configured to determine a main radiation direction of the transmission signal; and control circuitry configured to reduce a transmission power of the transmission signal in response to an increase in an inclination angle of the main radiation direction relative to a vertical direction.

2. The level radar apparatus of claim 1, wherein the control circuitry configured to adjust a transmission power of the transmission signal based on the main radiation direction and a radiation characteristic of the antenna, the level radar apparatus further comprising:

a data memory on which a radiation pattern of the antenna or a calculation rule for calculating the radiation pattern is stored.

3. The level radar apparatus according to claim 1, further comprising:

a communication interface, wherein the control circuitry is configured to request a radiation pattern from an external device via the communication interface.

4. The level radar apparatus according to claim 2, further comprising:

a communication interface, wherein the control circuitry is configured to request the radiation pattern from an external device via the communication interface.

5. The level radar apparatus according to claim 1, further comprising:

recognition circuitry configured to identify the antenna.

6. The level radar apparatus according to claim 2, further comprising:

recognition circuitry configured to identify the antenna.

7. The level radar apparatus according to claim 3, further comprising:

recognition circuitry configured to identify the antenna.

8. The level radar apparatus according to claim 5, wherein the recognition circuitry further comprises a data memory attached to the antenna and storing identification data of the antenna, and wherein said recognition circuitry is configured to transmit the identification data for identifying the antenna to said control circuitry.

9. The level radar apparatus according to claim 1, further comprising:

position determining circuitry configured to determine a position of the level radar, wherein the control circuitry is further configured to set the maximum transmission power of the transmission signal based on the position of the level radar.

10. The level radar apparatus according to claim 2, further comprising:

position determining circuitry configured to determine a position of the level radar, wherein the control circuitry is further configured to set the maximum transmission power of the transmission signal based on the position of the level radar.

11. The level radar apparatus according to claim 3, further comprising:

position determining circuitry configured to determine a position of the level radar, wherein the control circuitry is further configured to set the maximum transmission power of the transmission signal based on the position of the level radar.

12. The level radar apparatus according to claim 1, wherein said control circuitry is configured to set the maximum transmission power of the transmission signal based on the angle of the main radiation direction of the transmission signal towards the surface of a filling material.

13. The level radar apparatus according to claim 2, wherein said control circuitry is configured to set the maximum transmission power of the transmission signal based on the angle of the main radiation direction of the transmission signal towards the surface of a filling material.

14. The level radar apparatus according to claim 3, wherein said control circuitry is configured to set the maximum transmission power of the transmission signal based on the angle of the main radiation direction of the transmission signal towards the surface of a filling material.

15. The level radar according to claim 1, wherein said radiation angle circuitry comprises a tilt sensor.

16. The level radar according to claim 2, wherein said radiation angle circuitry comprises a tilt sensor.

17. The level radar according to claim 3, wherein said radiation angle circuitry comprises a tilt sensor.

18. A level radar antenna for a level radar apparatus configured for adaptive transmission power adjustment including the antenna configured to radiate a transmission signal in a direction of a medium, radiation angle circuitry configured to determine a main radiation direction of the transmission signal, and control circuitry configured to adjust a transmission power of the transmission signal based on the main radiation direction and a radiation characteristic of the antenna, comprising:

circuitry including data memory attached to the level radar antenna, the data memory storing identification data of the level radar antenna, wherein the circuitry is configured to reduce a transmission power of the transmission signal in response to an increase in an inclination angle of the radiation direction relative to a vertical direction.

19. A method for adaptively adjusting transmission power of a level radar, comprising:

increasing an inclination angle of a main radiation direction of a transmission signal of an antenna relative to a vertical direction;

determining the main radiation direction of the transmission signal of the antenna by radiation angle circuitry;

radiating the transmission signal in a direction of a product with the antenna with an emitted power not exceeding a maximum permissible emitted power; and reducing a transmission power of the transmission signal in response to the increase in the inclination angle of the main radiation direction relative to the vertical direction.

20. A non-transitory computer readable medium having stored thereon a program element which, when executed by circuitry of a level radar, instructs the circuitry to be configured to:

increase an inclination angle of a main radiation direction of a transmission signal of an antenna relative to a vertical direction;

determine the main radiation direction of the transmission signal of the antenna, a radiate the transmission signal in a direction of a product with the antenna with an emitted power not exceeding a maximum permissible emitted power, and reduce a transmission power of the transmission signal in response to the increase in the inclination angle of the main radiation direction relative to the vertical direction.

* * * * *